A. WELCH.
Stock Cars.
No. 134,335.
Patented Dec. 24, 1872.
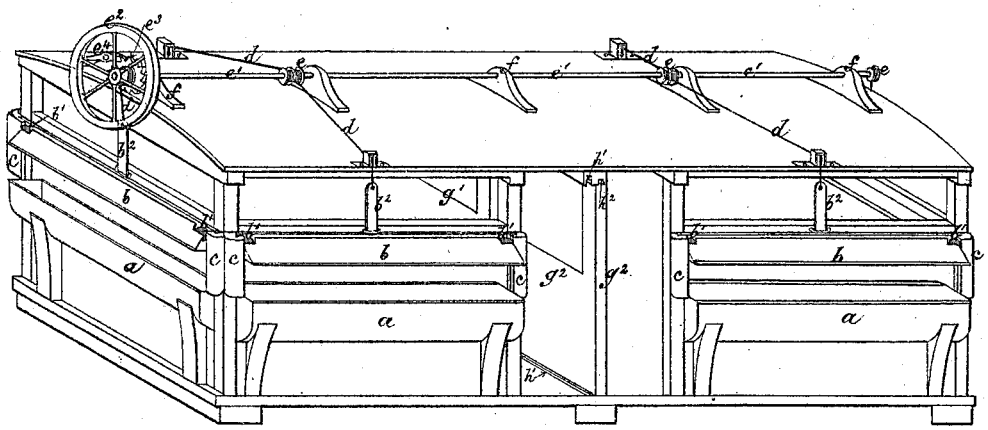
Witnesses
Geo: Pitt
D. Carpmael
Alfred Welch

UNITED STATES PATENT OFFICE.

ALFRED WELCH, OF SOUTHALL, ENGLAND.

IMPROVEMENT IN STOCK-CARS.

Specification forming part of Letters Patent No. 134,335, dated December 24, 1872.

*To all whom it may concern:*

Be it known that I, ALFRED WELCH, of Southall, in the county of Middlesex, England, a subject of the Queen of Great Britain, have invented or discovered new and useful "Improvements in Trucks for the Conveyance of Cattle and Horses by Railway;" and I, the said ALFRED WELCH, do hereby declare the nature of the said invention, and in what manner the same is to be performed, to be particularly described and ascertained in and by the following statement thereof—that is to say:

This invention has for its object improvements in trucks for the conveyance of cattle and horses by railway. For this purpose I adapt to such trucks water-troughs running along the sides and ends of the truck and provided with covers. The covers are fitted in upright guides, and can all be raised or lowered simultaneously by cords or chains passing to barrels on a horizontal axis mounted upon the roof of the truck. When the covers are lifted the axis is retained by a ratchet and pawl, and to let the covers down the pawl is lifted. I also divide the trucks into compartments by transverse sliding partitions; each partition is, in two parts, capable of passing each other.

In order that my said invention may be most fully understood and readily carried into effect, I will proceed to describe the drawing hereunto annexed.

Description of the Drawing.

The drawing shows the body of a truck constructed according to my invention.

$a\ a$ are the water-troughs. They may be filled when required by pipes from a tank on the roof of the truck. $b\ b$ are the covers of the troughs. $c\ c$ are the guides in which these covers work, and $b^1\ b^1$ are friction-pulleys on the covers to cause them to move freely. $b^2\ b^2$ are stems attached to the covers, and $d\ d$ are cords passing from these stems to the barrels $e\ e$ upon the axis $e^1$. $f\ f$ are bearings on the roof of the carriage, in which the axis $e^1$ is carried. $e^2$ is a hand-wheel for turning the axis, and $e^3$ is a ratchet-wheel with a pawl, $e^4$, to retain the axis when the covers are raised; the pawl $e^4$ is lifted when it is desired to lower the covers. $g^1$ and $g^2$ are the two parts of the transverse partition. They slide in separate guides $h^1$ and $h^2$ in the floor and roof of the truck, so that when the truck is being loaded or unloaded on either side both parts of the partition may be moved over to the opposite side of the truck out of the way. The entrance-door of the truck is not shown in the drawing, in order that the partition may be more clearly seen. By means of transverse partitions thus arranged the truck may be divided into any desired number of compartments.

What I claim is—

The construction of trucks for the conveyance of cattle or horses on railways with water-troughs, trough-covers, and lifting apparatus, substantially as described.

ALFRED WELCH.

Witnesses:
    A. F. WARREN,
    WILMER N. HARRIS,
*Both of No. 17 Gracechurch Street, London.*